J. W. LEDOUX.
VALVE MECHANISM.
APPLICATION FILED NOV. 28, 1908.

984,820.

Patented Feb. 21, 1911.
2 SHEETS—SHEET 1.

WITNESSES:
Rob R Kitchel
Jos. G. Denny Jr.

INVENTOR
John W. Ledoux
BY Charles N. Butler
ATTORNEY.

UNITED STATES PATENT OFFICE.

JOHN W. LEDOUX, OF SWARTHMORE, PENNSYLVANIA.

VALVE MECHANISM.

984,820.  Specification of Letters Patent.  Patented Feb. 21, 1911.

Application filed November 28, 1908. Serial No. 464,940.

*To all whom it may concern:*

Be it known that I, JOHN W. LEDOUX, a citizen of the United States, residing at Swarthmore, in the county of Delaware and State of Pennsylvania, have invented certain Improvements in Valve Mechanism, of which the following is a specification.

My invention is a valve mechanism designed to operate automatically and gradually, for the purpose of regulating the flow of a liquid without abrupt movement or shock.

The characteristic features of the invention are fully disclosed in the accompanying drawings and the following description thereof.

Figure 1:
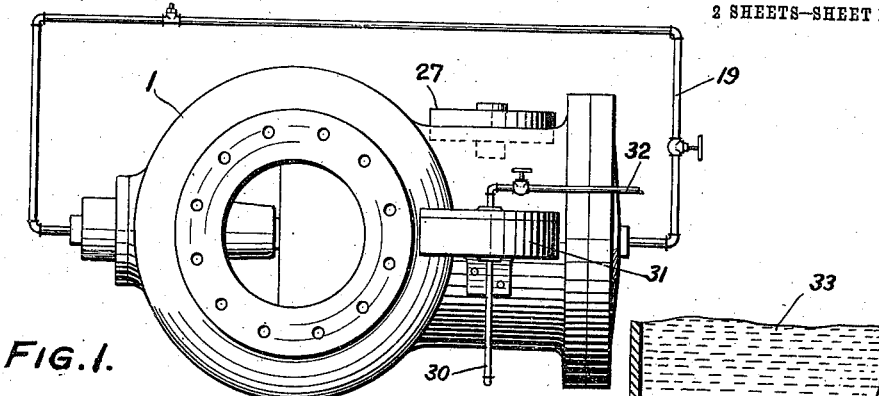
Figure 2:
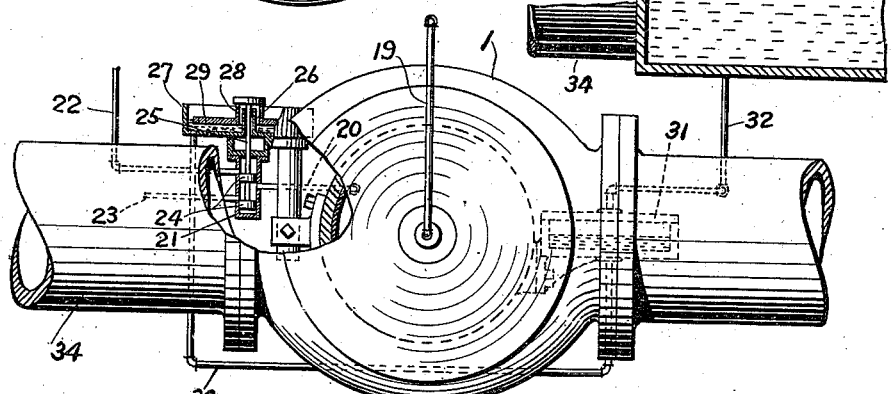
Figure 3:
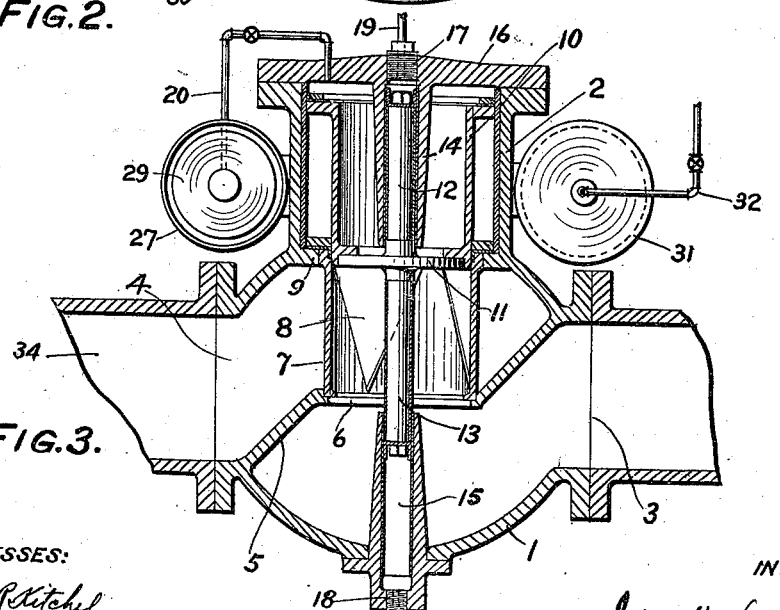
Figure 4:
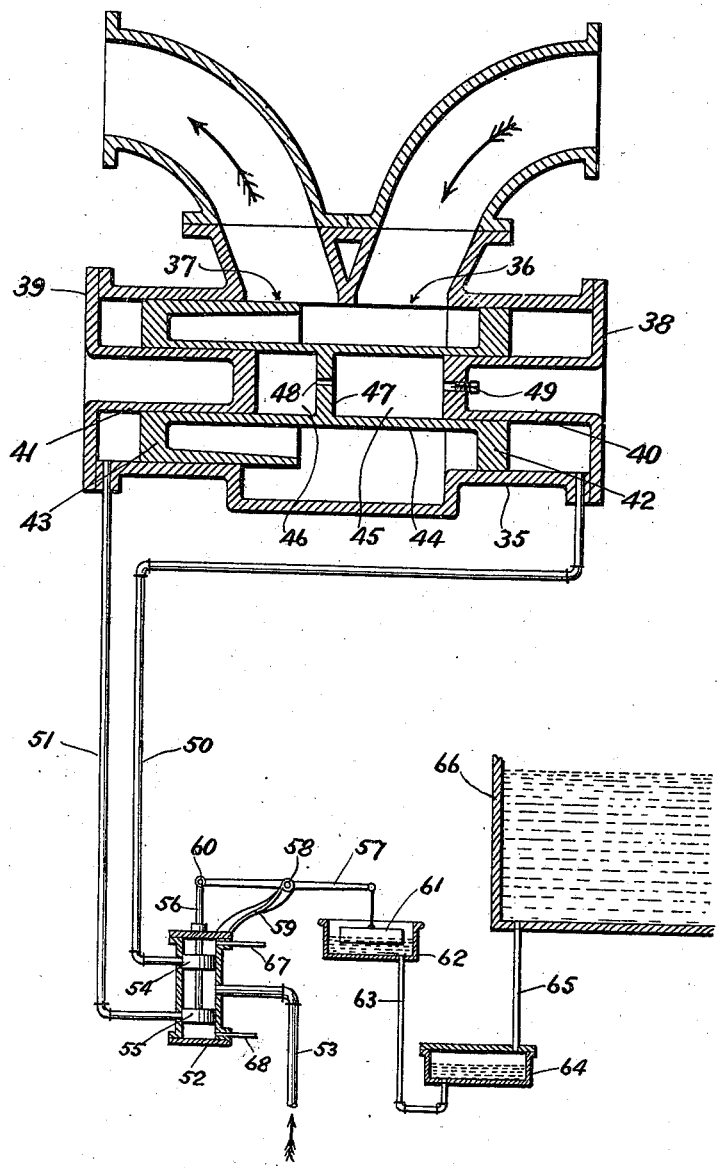

In the drawings, Figure 1 is an end view of a valve mechanism embodying my invention; Fig. 2 is a broken side view thereof; Fig. 3 is a longitudinal sectional elevation of the same, and Fig. 4 represents a modified form of the construction.

The mechanism, as illustrated in Figs. 1 to 3 inclusive, comprises a casing 1 having a cylinder 2, an inlet 3, an outlet 4, and between the inlet and outlet a diaphragm 5 containing an orifice 6 in line with the cylinder. A cylinder 7, containing the triangular ports 8, is disposed in line with the cylinder 2 and has its lower end seated in the diaphragm 5 in registration with the orifice 6, its upper end being fixed to the flange 9 within the inner end of the cylinder 2.

A valve in the form of the cylindrical piston 10 works in the cylinder 2 to control the ports 8, and to control the movements of this piston, its head 11 has fixed thereto and extending in the direction of movement the oppositely disposed pistons 12 and 13 which work in the respective cylinders 14 and 15, the cylinder 14 being carried by the removable head 16 of the cylinder 2 and the cylinder 15 being set in the opposite part of the casing 1. The outer ends of the cylinders 14 and 15 are closed by the plugs 17 and 18 through which the interiors of these cylinders are connected by the pipe 19. A liquid, such as oil, is contained in the cylinders 14 and 15 and the pipe 19 connecting them, so that the movement of the valve 10 in either direction will be subject to the retarding action consequent upon the contracted character of the passage 19 and the time required for the oil to pass therethrough.

The valve 10 is subject to liquid pressure communicated from the inlet 3 tending to move it to open the ports 8 and from the pipe 20 tending to move it to close these ports.

The pipe 20 is connected with the valve chamber 21 with which are connected the liquid pressure pipe 22 and the waste pipe 23. Within the valve chamber is a valve comprising the pistons 24 connected together by a rod 25, which passes upwardly through the head of the chamber 21 and through the sleeve 26 rising from the bottom of the mercury vessel 27. A connection 28 is fixed to the end of the stem 25, projecting beyond the sleeve 26, and extends downwardly without the latter to a connection with a float 29 in the vessel 27. The bottom of this vessel is connected by a pipe 30 with the bottom of a lower closed mercury vessel 31 which is connected through its top by a pipe 32 with the bottom of a water reservoir 33, the latter being supplied by a conduit 34 connecting it with the valve outlet 4.

When water in the reservoir 33 falls, the pressure on the mercury in the vessel 31 is reduced, mercury in the vessel 27 falls by reason of the change of the balance, the float 29 descends, the valve comprising the pistons 24 establishes communication between the pipe 20 and the waste pipe 23 to permit the piston valve 10 to move outwardly in the cylinder 2, and pressure of water in the conduit 34 acting through the inlet 3 moves the piston 10 to open the ports 8 and admit water to the reservoir 33.

When the water in the reservoir 33 rises to a predetermined height, its head or pressure, exerted through the pipe 32, depresses the mercury in the vessel 31 and elevates it in the vessel 27, lifting the float 29 and the pistons 24 to establish communication between the pressure pipe 22 and the pipe 20 communicating with the chamber 2. The pressure now communicated to the piston 10 causes it to gradually close the ports 8 to cut off the flow to the reservoir.

The movement of the piston or valve 10 in each direction is subject to the modifying influence of the buffer mechanisms comprising the parts 12, 13, 14, 15 and 19, in transferring oil between the chambers 14 and 15 through the pipe 19.

In the modified construction shown in Fig. 4, the mechanism comprises a cylinder 35, having an inlet port 36 and an outlet port 37, the cylinder heads 38 and 39 having thereon the respective inwardly projecting stationary pistons 40 and 41. Within the cylinder 35 is a movable piston valve comprising the heads 42 and 43 connected by the reduced body portion 44, the head 43 controlling the port 37. Cylindrical chambers 45 and 46 are formed within the movable piston valve for the reception of the respective stationary pistons 40 and 41, and between these chambers is a diaphragm 47 containing a small passage 48 by which a liquid, as oil, in these chambers may escape from one to the other, the oil being introduced suitably by way of a normally closed passage 49 in the head of the piston 40.

Pipes 50 and 51 connect the opposite ends of the valve cylinder 35 with the opposite ends of a valve cylinder 52 with which is connected a pressure pipe 53. The cylinder 52 has therein a valve comprising the pistons 54 and 55 which are connected with the rod 56 extending through an end of the cylinder.

A lever 57 is fulcrumed by the pivotal bearing 58 on the bracket or strut 59 and is connected by the pivotal bearing 60 with the rod 56. A float 61 is connected with the lever 57, so as to balance the valve pistons 54 and 55, and depends into a vessel 62. The bottom of the latter vessel is connected by a pipe 63 with the bottom of a closed lower vessel 64 which in turn has its top connected by a pipe 65 with the bottom of the higher reservoir 66. Water contained in this reservoir is sustained by a heavy liquid, such as mercury, contained in the parts 62, 63, and 64.

The head of water in the reservoir 66 will determine the mercury level in the chamber 62, and this mercury level will, through the float and lever, determine the position of the pistons 54 and 55. As the head in the reservoir rises, the pistons 54 and 55 will fall, so as to establish communication between the pipes 51 and 53, and thereby pressure is communicated to the piston head 43. Acting under this pressure the valve is moved and its head 43 gradually closes the port 37, under the retarding influence of the liquid escaping from the chamber 45 into the chamber 46 through the contracted orifice 48.

To permit waste from the ends of the respective cylinders 35 and 52, when it is necessary to discharge the ends of the cylinder 35 by reason of the movements of the piston therein, vents 67 and 68 are placed in the ends of the cylinder 52.

Having described my invention, I claim:

1. In a valve mechanism, a casing, a reciprocating valve in said casing, a piston and cylinder connected with each end of said valve, and a contracted passage connecting said cylinders.

2. In a valve mechanism, a casing having a port, a piston in said casing for controlling said port, and fluid pressure mechanism for automatically operating said piston, said mechanism comprising a conduit connected with said casing for communicating pressure to said piston, a valve for controlling the flow through said conduit, a vessel in line with said valve, and a float fixed to the stem of said valve and disposed in said vessel.

3. In a valve mechanism, in combination with a conduit and a reservoir with which said conduit is connected, a casing having a port in said conduit, a piston valve disposed in said casing so as to be operated by the pressure of liquid in said conduit to open said port, a pipe for conveying pressure to said casing to cause said valve to close said port, a valve for controlling the flow through said pipe, a vessel, a float in said vessel, means for connecting said valve last named with said float, and means for connecting said vessel and reservoir whereby said float is operated by changes of head in said reservoir.

In witness whereof I have hereunto set my hand this 23rd day of November, 1908, in the presence of the subscribing witnesses.

JOHN W. LEDOUX.

Witnesses:
ROBERT JAMES EARLEY,
Jos. G. DENNY, Jr.